United States Patent
Rafaelof et al.

(10) Patent No.: US 6,768,229 B2
(45) Date of Patent: Jul. 27, 2004

(54) COIL CONSTRUCTION FOR VOICE COIL MOTOR

(75) Inventors: Menachem Rafaelof, Superior, CO (US); Ted Randal McDonald, Louisville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/187,856

(22) Filed: Jul. 1, 2002

(65) Prior Publication Data

US 2003/0127915 A1 Jul. 10, 2003

Related U.S. Application Data

(60) Provisional application No. 60/374,079, filed on Apr. 18, 2002.

(51) Int. Cl.[7] .................................................. H02K 41/00
(52) U.S. Cl. ........................................ 310/12; 360/266.9
(58) Field of Search ............................. 360/264.7, 265, 360/266.4, 266.9; 310/12, 13, 14

(56) References Cited

U.S. PATENT DOCUMENTS

| | | | | |
|---|---|---|---|---|
| 2,014,524 A | | 9/1935 | Franz ........................... 336/200 |
| 3,735,169 A | * | 5/1973 | Baike et al. .................. 310/214 |
| 4,621,231 A | | 11/1986 | Heinrich et al. ............. 324/142 |
| 4,651,254 A | | 3/1987 | Brede et al. .................. 361/248 |
| 4,658,162 A | * | 4/1987 | Koyama et al. ............. 310/68 R |
| 4,763,035 A | | 8/1988 | Zeeman ....................... 310/208 |
| 4,962,329 A | | 10/1990 | Fujita et al. ................. 310/208 |
| 5,462,763 A | | 10/1995 | Kondoh ........................ 427/96 |
| 5,491,598 A | * | 2/1996 | Stricklin et al. ........... 360/265.6 |
| 5,644,183 A | | 7/1997 | Van Loenen et al. ....... 310/268 |
| 5,671,197 A | * | 9/1997 | Matsuda et al. ............. 369/222 |
| 5,761,000 A | | 6/1998 | Ahn ......................... 360/99.08 |
| 5,768,062 A | | 6/1998 | Anderson et al. ......... 360/245.9 |
| 5,781,373 A | * | 7/1998 | Larson et al. ............. 360/97.02 |
| 5,872,855 A | * | 2/1999 | Porrazzo et al. ............. 381/400 |
| 6,236,289 B1 | * | 5/2001 | Slenker ....................... 333/181 |
| 6,317,281 B1 | * | 11/2001 | Ogawa et al. ................ 360/60 |

* cited by examiner

*Primary Examiner*—Thanh Lam
*Assistant Examiner*—Judson H. Jones
(74) *Attorney, Agent, or Firm*—Merchant & Gould P.C.

(57) ABSTRACT

A coil construction for a voice coil motor is disclosed. The coil construction includes a series of stacked planar coils disposed on a substrate material. Each planar coil is separated from its neighboring coil or coils by a viscoelastic material to reduce vibration of the coil construction. The coil construction is attached to an actuator arm. Control circuitry creates a current in the coil construction to position a head on the actuator arm. Also disclosed is a method for making a coil for a voice coil motor. The method includes the steps of masking a substrate having a conductive layer with a photoresist, exposing the mask to create a pattern of planar coils, developing the photoresist, and etching the conductive layer to create a planar coil.

20 Claims, 4 Drawing Sheets

COIL CONSTRUCTION FOR VOICE COIL MOTOR

RELATED APPLICATIONS

This application claims priority of U.S. provisional application Serial No. 60/374,079 filed Apr. 18, 2002.

FIELD OF THE INVENTION

This application relates generally to voice coil motors and more particularly to a coil construction for a voice coil motor.

BACKGROUND OF THE INVENTION

In a disc drive, a head for reading and writing data to and from a disc is supported on an actuator arm. The actuator arm controls the position of the head through the use of a voice coil motor (VCM), which typically includes a coil attached to an actuator assembly, as well as one or more permanent magnets which establish a magnetic field in which the coil is immersed. The controlled application of current to the coil causes magnetic interaction between the permanent magnets and the coil so that the coil moves in accordance with the well-known Lorentz relationship. As the coil moves, the actuator assembly pivots about a bearing shaft assembly, and the head (or heads) is caused to move across the surfaces of the discs.

The coil is fabricated by winding copper wire around a mandrel. Adhesion of a coil wire to the adjacent wires is accomplished by pre-coating the wire with a bond coat material and then heating the covered wire while winding the coil. The coil is heated to allow plasticizers to outgas from the coating. During this process, voids can form in the bond coat, which can result in delaminating of the bond coat from the wires. The delamination can allow individual wires in the coil to vibrate, causing undesirable noise during operation. A wire may also contact an adjacent wire if it becomes unbonded further causing undesired vibration effects. Another source of noise or unwanted vibration in current coils is out-of-plane forces. These forces cause additional vibration of the voice coil motor.

Accordingly there is a need for a coil construction that reduces the undesirable vibration due to delamination and out-of-plane forces. The present invention provides a solution to this and other problems, and offers other advantages over the prior art.

SUMMARY OF THE INVENTION

Against this backdrop the present invention has been developed. One embodiment of the present invention is directed to a coil construction for a voice coil motor. The coil construction includes a series of planar coils made from electrically conductive material formed on a substrate. The planar coils are disposed on a substrate and the coils are formed into a stacked array wherein each planar coil is separated from its neighboring coil or coils by a dampening material. The coil construction is assembled into an actuator arm for use in a disc drive and used to position a head located on the actuator arm.

Another embodiment of the invention is directed to a disc drive assembly including an actuator arm assembly for positioning a head over a disc surface. A coil construction is disposed on the actuator arm assembly and current from control circuitry through the coil construction controls the position of the head over the disc surface. The coil is a part of a voice coil motor that creates forces to move the actuator arm assembly to position the head. The coil construction includes a series of adjacent layers of stacked planar coils disposed on a substrate. The planar coils are electrically connected in series to form a single electrical current path.

These and various other features as well as advantages which characterize the present invention will be apparent from a reading of the following detailed description and a review of the associated drawings.

DETAILED DESCRIPTION

Figure 1:
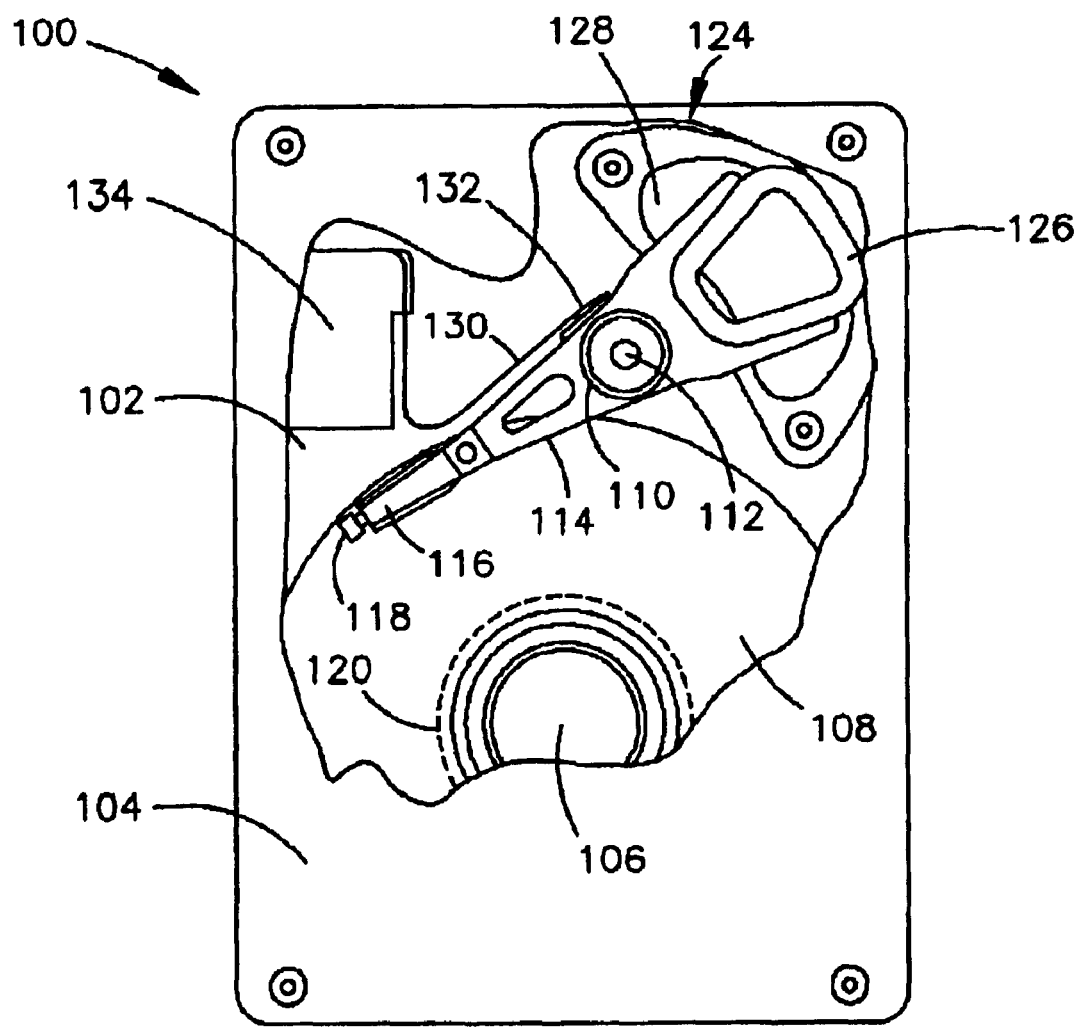
FIG. 1 is a plan view of a disc drive for incorporating an embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
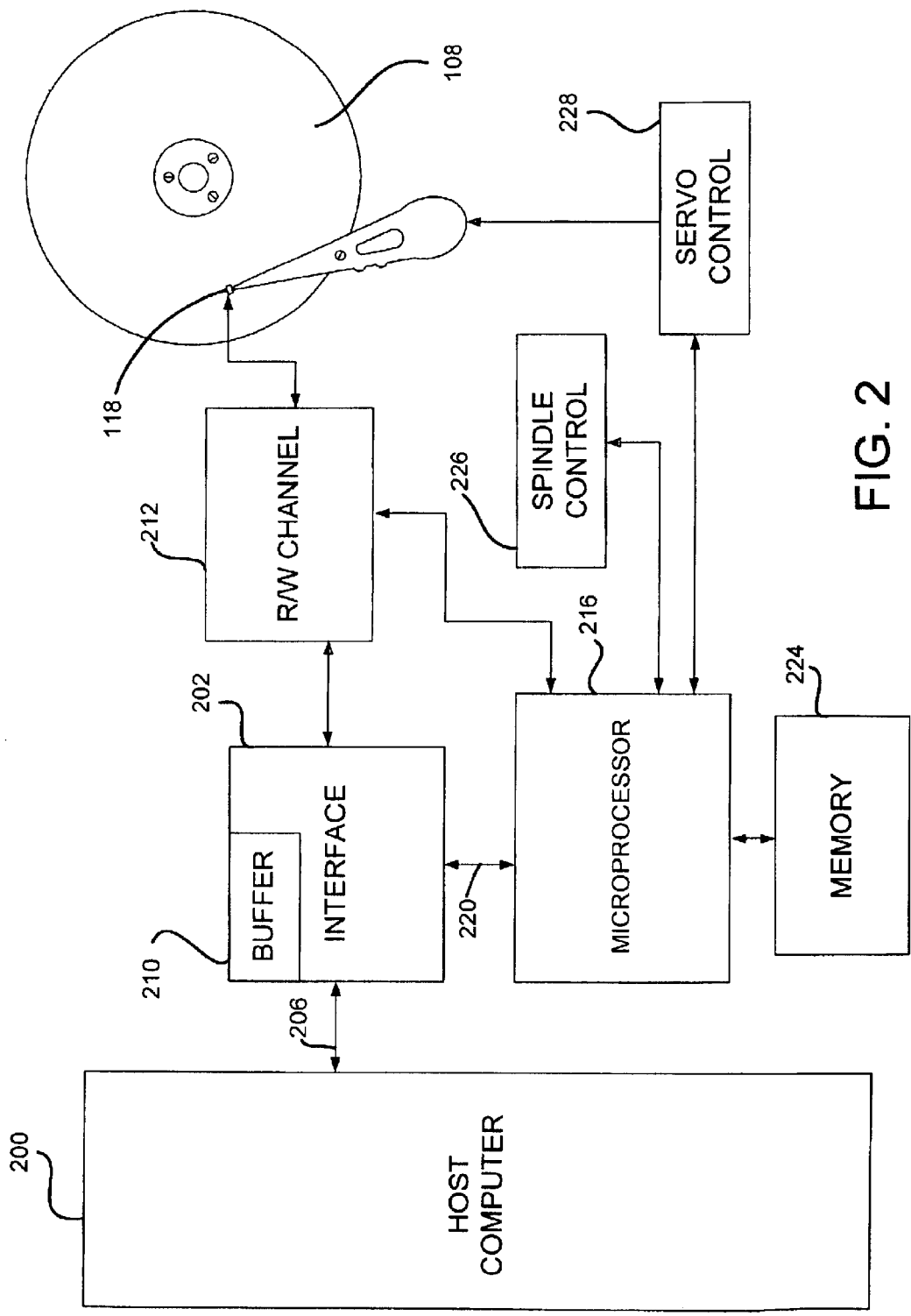
FIG. 2 is a block diagram of components that control the disc drive of FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is operably connected to a host computer 200 in a conventional manner. Control communication paths are provided between the host computer 200 and a disc drive microprocessor 216, the microprocessor 216 generally providing top level communication and control for the disc drive 200 in conjunction with programming for the microprocessor 216 stored in microprocessor memory (MEM) 224. The MEM 224 can include random access memory (RAM), read only memory (ROM) and other sources of resident memory for the microprocessor 216.

The discs 108 are rotated at a constant high speed by a spindle motor control circuit 226, which typically electrically commutates the spindle motor 106 (FIG. 1) through the use of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 228 provides such control. During a seek operation the microprocessor 216 receives information regarding the velocity of the head 118, and uses that information in conjunction with a velocity profile stored in memory 224 to communicate with the servo control circuit 228, which will apply a controlled amount of current to the coil 126, thereby causing the actuator assembly 110 to be pivoted.

Data is transferred between the host computer 200 or other device and the disc drive 100 by way of an interface 202, which typically includes a buffer 210 to facilitate high speed data transfer between the host computer 200 or other device and the disc drive 100. Data to be written to the disc drive 100 is thus passed from the host computer 200 to the interface 202 and then to a read/write channel 212, which encodes and serializes the data and provides the requisite write current signals to the heads 118. To retrieve data that has been previously stored in the disc drive 100, read signals are generated by the heads 118 and provided to the read/write channel 212, which performs decoding and error detection and correction operations and outputs the retrieved data to the interface 202 for subsequent transfer to the host computer 200 or other device. Such operations of the disc drive 100 are well known in the art and are discussed, for example, in U.S. Pat. No. 5,276,662 issued Jan. 4, 1994 to Shaver et al.

Figure 5:
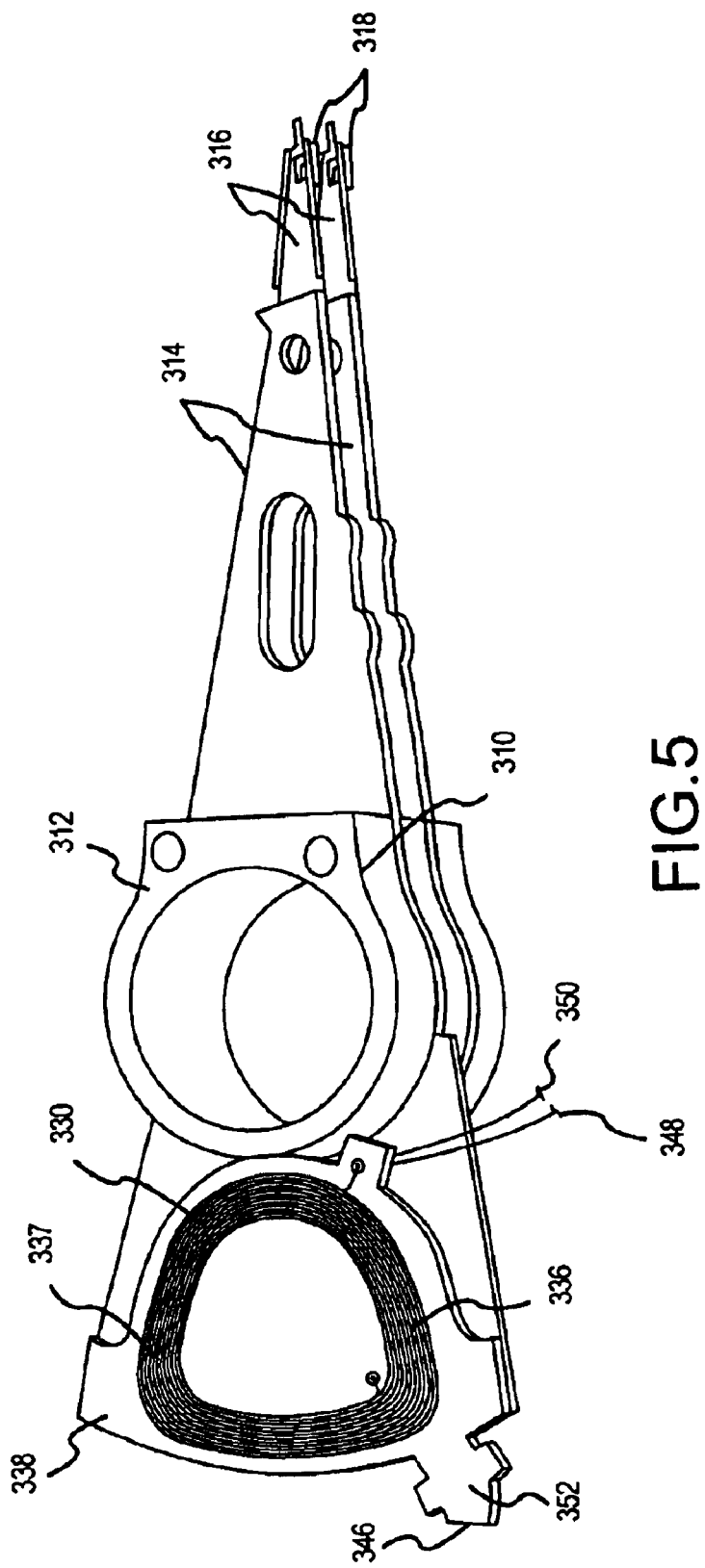
FIG. 5 is a perspective view of an actuator arm assembly incorporating the coil construction of FIG. 4.

To improve the acoustical performance and attenuate self-induced vibrations in an actuator arm assembly, the present invention has been developed. Referring to FIG. 5, shown is an actuator arm assembly 310 incorporating an example embodiment of a coil construction 330 of the present invention. The actuator arm assembly 310 includes a bearing housing 312, a plurality of actuator arms 314, and a plurality of flexures 316, each flexure 316 supporting a head 318, and a coil assembly 330. While the actuator arm assembly 310 is shown supporting a plurality of heads 318, it is not uncommon for an actuator arm assembly 310 to support only one head 318.

The coil construction 330 is located on the actuator arm assembly 310 and is also part of the voice coil motor (VCM) (not shown) of the disc drive. Referring to FIGS. 3A–5, the coil construction 330 includes a series of planar coils 336 arranged into a coil 337 that allows the actuator arm assembly 310 to move when a current is applied to the coil 337. The coil 337 operates in the same manner as conventional coils to position the heads 318 on the actuator arm assembly 310. The coil construction 330 is shown in FIG. 5 with the coil 337 formed and mounted to the actuator arm assembly 310.

Figure 3A:
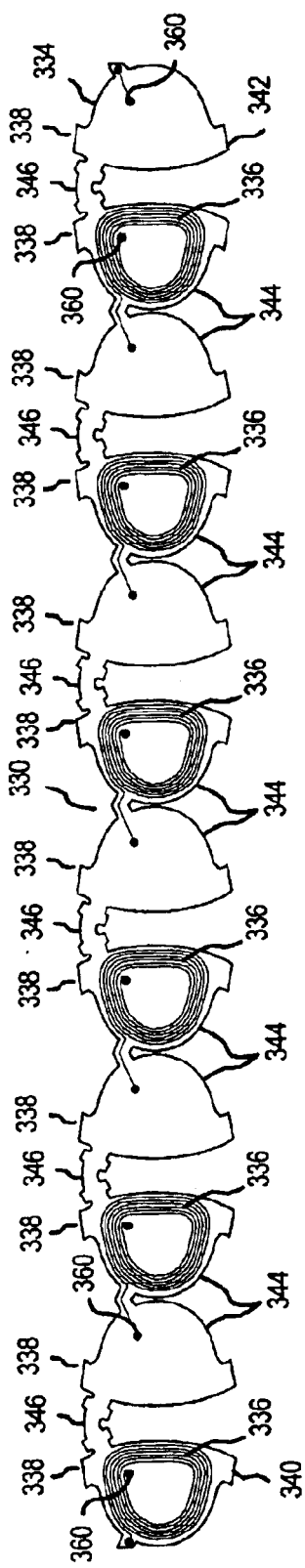
FIG. 3A is a perspective view from a first side of an example embodiment of a coil construction of the present invention.
Figure 3B:
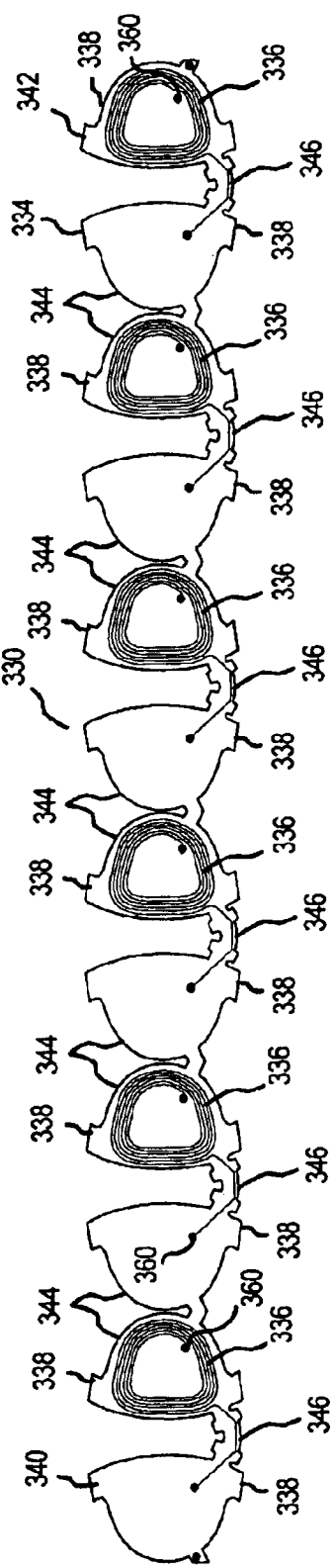
FIG. 3B is a perspective view from a second side of the coil construction of FIG. 3A.

The coil construction 330 is formed by stacking a series of planar coils 336 each disposed on a substrate section 338. In the example embodiment shown, the substrate sections 338 include first and second end sections 340, 342 and a plurality of intermediate sections 344. Each substrate section 338 is joined to its neighboring section(s) by a folding section 346. The folding sections 346 allow the coil construction 330 as shown in FIGS. 3A–B to be folded to form the coil 337 shown in FIG. 5, thereby forming a series of adjacent layers of planar coils 336 each bonded to a corresponding substrate section 338. The coil construction 330 in FIGS. 3A–B is shown in the extended position and is shown in the folded position in FIGS. 4–5.

Referring to FIG. 5, the planar coils 336 are electrically connected to form a single coil 337 when the coil construction 330 is in the folded position to form the coil 337. Each planar coil 336 is electrically connected to the adjacent planar coil 336 by through holes, or vias 360, formed in the substrate section 338. The electrical connection can be accomplished in various ways, which are well within the knowledge of one of skill in the art, and are not part of the present invention. Preferably, the electrical connection is made through the vias 360 by plating or a solder connection.

The coil construction 330 is mounted to the actuator arm assembly 310 by techniques known to those of skill in the art, but the coil construction 330 is preferably bonded to the actuator arm assembly 310 by an epoxy layer between the actuator arm assembly 310 and the second end section 344 of the coil construction 330. Another preferred method of joining the coil construction 330 to the actuator arm assembly 310 is by placing the coil construction 330 in its proper position and then overmolding the entire assembly together. Overmolding typically uses a PPS (polyphenylene sulfide) or LCP (liquid crystal polymer) material that is injection molded around the entire assembly to bond all the parts together.

The coil construction 330 can also include leads 348, 350. The leads 348, 350 are connected to a power source in the control circuitry and allow current to pass through the coil 337, to move the actuator arm assembly 310 to position the heads 318 during use. The leads 348, 350 can be omitted and the wires of the coil 337 can be directly connected to pins in the voice coil motor.

Preferably, the coil construction of the present invention is fabricated by starting with a planar sheet of substrate coated on both sides with a layer of conductive material, preferably copper. A substrate coated on a single side can be used to for the coil construction of the present invention, but using a substrate coated on both sides, such as a flex circuit with copper on both sides, lends itself to the accordion-fold embodiment described in FIGS. 3A–5 since it is desirable for the planar coils 336 to have the substrate material 338 between adjacent layers.

The substrate is preferably a polyimide such as KAPTON® (made by DuPont) that is suitable for use in the photolithography process, but one of skill in the art will recognize that many materials suitable for flexible circuits can be used. Preferably, the coil construction 330 is then formed using conventional photolithographic techniques. The coated substrate is covered with a photoresist and an image is patterned on the photoresist, which can be of the positive or negative type. The substrate with the photoresist is then developed and etched using techniques well known in the art. The end product is the formation of the coil construction 330 in the extended position.

Preferably, the fabrication process uses a KAPTON® substrate 0.001 inches thick that is coated on both sides with a layer of copper 0.0028 inches thick. Preferably, the copper traces that form the planar coils 336 are then processed to be approximately 0.008 inches wide, giving a trace width to material thickness aspect ratio of 2.8. One of skill in the art will recognize that the coil resistance can be controlled changing the width or height of the traces, as well as the total length of the traces through the coil. The metal layer can also be a different material on each side of the coated substrate.

After the unfolded coil construction 330 is formed, it is covered with a viscoelastic polymer adhesive and/or adhesive to achieve an optimum level of damping and structural stiffness. Preferably, epoxy or a pressure sensitive adhesive is used. The coil construction 330 is then formed into a coil 337 in the folded position by folding each of the sections 340, 342, 344 onto its neighboring section(s) of the coil 337, at a fold made at each folding section 346. The sections are folded so that there is a substrate section 338 between each planar coil 336. If necessary, the coil construction 330 is then pressed under heated conditions to bond the successive layers together. After the folded coil construction 330 is formed it is then mounted onto the actuator arm assembly 310 and the leads 348, 350 are electrically connected to the control circuitry (not shown) of the disc drive.

Figure 4:
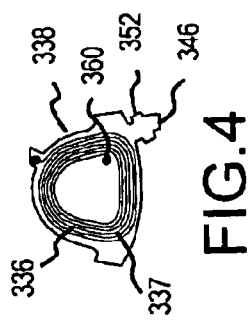
FIG. 4 is a top view of the coil construction of FIG. 3A assembled into a coil.

Additional features can also be integrated into the coil construction 330 of the present invention. Referring to FIGS. 4 and 5, a limit stop 352 is formed by the folding sections 346 when the coil construction 330 is in the folded position. The limit stop 352 engages with a limiting post (not shown) located in the disc drive assembly to limit travel of the actuator arm assembly 310.

An advantage of the coil construction of the present invention is that it can be formed by creating an array of coils on a single substrate, then folding and laminating the coils in one process step, and finally cutting the laminated stack to a desired shape to create individual coils. Another advantage is that the substrate on the viscoelastic material used between the adjacent layers of planar coils acts as a damper to reduce undesirable vibrations in the coil due to the various causes discussed previously. The method of making the coil construction of the present invention also is able to create various coil shapes that are decoupled from having to develop expensive coil winding tools.

One example embodiment of the present invention is directed to a coil construction (such as 330) for a voice coil motor (such as 124). The coil construction (such as 330) includes a series of planar coil sections (such as 336) made from an electrically conductive material. The planar coil sections (such as 336) are electrically connected in series and each planar coil (such as 336) is joined to a corresponding substrate section (such as 334). The substrate sections (such as 334) include first and second end sections (such as 340, 342) and at least one intermediate section (such as 344). Each intermediate section (such as 344) has two neighboring sections and each end section (such as 340, 342) has one neighboring section. The coil construction (such as 330) forms a coil (such as 337) when the substrate sections (such as 334) are stacked.

Another example embodiment of the present invention is directed to a disc drive assembly (such as 100). The disc drive assembly (such as 100) includes an actuator arm assembly (such as 310) for positioning a head (such as 318) over a surface of a disc (such as 108). The disc drive assembly (such as 100) further includes a coil construction (such as 300) disposed on the actuator arm assembly (such as 310). The coil construction (such as 330) includes a series of adjacent layers of stacked planar coils (such as 336) disposed on a substrate. The planar coils (such as 336) are electrically connected in series to form a single electrical current path. The disc drive assembly (such as 100) also includes control circuitry electrically connected in series with the coil construction (such as 330) and a voice coil motor assembly (such as 124) for moving the actuator arm assembly (such as 310) to position the head (such as 318) when current is passed through the coil construction (such as 330) by the control circuitry.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, a metallic surface can be added to the coil construction to enhance heat transfer from the coil or increase structural stiffness. Also, surfaces or sections made of polymers or composites can be added to modify the stiffness of the coil construction. Numerous other changes may be made which will readily suggest themselves to those skilled in the art and which are encompassed in the spirit of the invention disclosed and as defined in the appended claims.

What is claimed is:

1. A coil construction for a voice coil motor comprising:
   a series of planar coil sections made from an electrically conductive material, the planar coil sections being electrically connected in series;
   each planar coil joined to a separate substrate section with adjacent coil section bonded to opposite side of adjacent substate sections; and
   the substrate sections including first and second end sections and at least one intermediate section, each intermediate section having two neighboring sections and each end section having one neighboring section wherein the coil construction forms a coil when the substrate sections are stacked in a folded position.

2. The coil construction of claim 1 further comprising:
   a first and a second lead, the first lead being in electrical communication with the planar coil on the first end section of the substrate and the second lead being in electrical communication with the planar coil on the second end section of the substrate.

3. The coil construction of claim 1 further comprising:
   an actuator arm assembly, the coil construction being disposed on the actuator arm assembly to interact with a magnet of a voice coil motor to position a head located on the actuator arm assembly.

4. The coil construction of claim 3, wherein the actuator arm assembly includes a plurality of heads.

5. The coil construction of claim 1, further comprising a viscoelastic adhesive material between adjacent layers of the coil construction when the coil construction is in the folded position.

6. The coil construction of claim 1, wherein each planar coil is formed by an electrically continuous trace of the conductive material, and wherein each trace is 0.008 inches wide.

7. The coil construction of claim 1, wherein the substrate is made from a polyimide material.

8. The coil construction of claim 7, wherein the polyimide material is KAPTON®.

9. A disc drive assembly comprising:
  an actuator arm assembly positioning a head over a surface of a disc;
  a coil construction disposed on the actuator arm assembly, the coil construction including a series of adjacent layers of stacked planar coils, each coil disposed on a substrate section and adjacent coils mounted on opposite sides of adjacent substrate sections, the planar coils electrically connected in series to form a single electrical current path;
  control circuitry electrically connected in series with the coil construction;
  a voice coil motor assembly moving the actuator arm assembly to position the head when current is passed through the coil construction by the control circuitry.

10. The disc drive of claim 9, wherein the coil construction includes first and second leads, the first lead being in electrical communication with a first planar coil disposed on the top of the stacked layers and the second lead being in electrical communication with a second planar coil disposed on the bottom of the stacked layers.

11. The disc drive assembly of claim 9, wherein the actuator arm assembly includes a plurality of leads.

12. The disc drive assembly of claim 9, further comprising a bonding adhesive between the stacked layers.

13. The disc drive assembly of claim 9, wherein the substrate is made from a polyimide material.

14. The disc drive assembly of claim 13, wherein the polyimide material is KAPTON®.

15. The disc drive assembly of claim 9, further comprising an overmold material joining the coil construction to the actuator arm assembly.

16. A folded, stacked coil construction for a voice coil motor comprising:
  a substrate having a series of substrate sections, each substrate section having a first side and an opposite second side;
  a plurality of substantially planar coil section made from an electrically conductive material, each coil section attached to a separate section and adjacent coil sections attached to the opposite sides of adjacent sections; and
  the substrate sections folded together resulting in the coils sections being electrically connected to one another in series.

17. The folded, stacked construction of claim 16 additionally comprising:
  each coil section has a conductive terminal at each end of the coil section; and
  the series electrical connection being formed being conductive terminal of adjacent coil sections.

18. The folded, stacked coil construction of claim 16 wherein the folded substrate sections insulate adjacent stacked coil sections of the stacked coil.

19. The folded, stacked coil construction of claim 16 further comprising a bonding adhesive between adjacent folded substrate sections.

20. The folded, stacked coil construction of claim 16 wherein each coil section is deposited on a substrate section.

* * * * *